United States Patent [19]

Stotz et al.

[11] Patent Number: 4,482,075

[45] Date of Patent: Nov. 13, 1984

[54] FUEL TANK IN PARTICULAR A PLASTIC FUEL TANK

[75] Inventors: Manfred Stotz, Aichwald; Dieter Scheurenbrand, Wolfschlugen, both of Fed. Rep. of Germany

[73] Assignee: Daimler-Benz Aktiengesellschaft, Fed. Rep. of Germany

[21] Appl. No.: 416,246

[22] Filed: Sep. 9, 1982

[30] Foreign Application Priority Data

Sep. 11, 1981 [DE] Fed. Rep. of Germany ....... 3135982

[51] Int. Cl.³ ...................... B65D 25/20; B65D 51/00; F16L 55/00

[52] U.S. Cl. .................................. 220/86 R; 220/301; 220/DIG. 33; 285/382; 296/1 C

[58] Field of Search ..................... 220/86 R, 295, 298, 220/293, 309, 301, 304; 215/332, 324; 285/382, 401, 376, 81, 86; 296/1 C; 280/5 A

[56] References Cited

U.S. PATENT DOCUMENTS

| 1,001,128 | 8/1911 | Elledse | 220/309 |
|---|---|---|---|
| 1,485,136 | 2/1924 | House | 220/309 |
| 2,008,245 | 7/1935 | Curtis et al. | 285/382 X |
| 2,016,224 | 10/1935 | Bukott | 220/295 |
| 3,040,712 | 6/1962 | Harrah | 220/298 X |
| 3,128,006 | 4/1964 | Rousselet | 220/295 |
| 3,330,439 | 7/1967 | Moorman | 220/72 X |
| 4,212,318 | 7/1980 | Warmbold | 220/86 R X |
| 4,270,667 | 6/1981 | Neiman | 220/86 R |

FOREIGN PATENT DOCUMENTS

| 215348 | 10/1960 | Austria | 220/293 |
|---|---|---|---|
| 886861 | 8/1953 | Fed. Rep. of Germany | 215/332 |
| 1065067 | 5/1954 | France | 215/324 |
| 525892 | 9/1940 | United Kingdom | 215/332 |
| 1163184 | 9/1969 | United Kingdom | 285/382 |

Primary Examiner—Allan N. Shoap
Attorney, Agent, or Firm—Craig & Burns

[57] ABSTRACT

A fuel tank, preferably made of plastic material, to the filler neck of which an attachment base for a cap is so secured that dimensional tolerances as also dimensional changes caused by differing coefficients of temperature can be compensated by an elastic seal which is axially clamped therebetween; the attachment base is thereby axially supported against an abutment surface of the filler neck by means of an annular shoulder by way of an interposed elastic sealing means.

13 Claims, 4 Drawing Figures

FUEL TANK IN PARTICULAR A PLASTIC FUEL TANK

The present invention relates to a fuel tank, in particular to a fuel tank made from plastic material, for motor vehicles, with a filler neck and a separate attachment base fastened to the filler neck for a removable cap. The attachment base is sealed with respect to the filler neck and includes a skirt which engages axially over the filler neck in the free end zone thereof, whereby the skirt is supported, both axially and circumferentially, against the filler neck.

In a known fuel tank of this type (German Utility Model No. 1,718,861), the fuel tank is made of aluminum and an attachment base, made of another material, particularly of steel, is fastened to the filler neck of the tank, whereby the skirt of the attachment base engages into the filler neck of the tank. Within the zone of overlap of the base-skirt with the filler neck, the two parts are fastened to each other by means of a riveted connection or the like, whereby the gap between the skirt and the neck is sealed off by a sealant or an adhesive. In view of the forces which act on the attachment base during the emplacement or removal of the cap, as also when the tank is subjected to pressure, the connection of the attachment base with the filler neck of the tank is hardly tight or leakproof in the long run with this type of construction, particularly if, as provided with the known solution, the filler neck, the entire tank and the attachment base are made of materials having dissimilar coefficients of expansion. In addition thereto, the prior art solution is also expensive from a manufacturing point of view.

The present invention is concerned with the task for providing a fuel tank, in which the connection between the attachment base and the filler neck, with simple manufacture, is permanently tight, and more particularly also if materials having dissimilar coefficients of expansion are possibly used for the filler neck and the attachment base.

This present invention achieves a securely sealed tank and filler neck arrangement wherein the attachment base is axially supported against a support or abutment surface of the filler neck, by means of an annular shoulder by way of interposed elastic sealing means. As a result of this axial support in conjunction with the corresponding clamping of the elastic sealing means, on the one hand, a tolerance-compensation is possible by the elasticity of the sealing means which assures the required tightness of the connection even in the case of dissimilar expansion coefficients, deviations from the specified dimensions, or the like and, on the other hand, with this type of seal, a fixing of the attachment base relative to the filler neck can be realized which assures a secure fit even under all occurring loads without impairment of the seal.

According to a further feature of the present invention, it is appropriate if the filler neck is provided over its circumference with undercuts within the area overlapped by the skirt and if the attachment base is clamped relative to the filler neck by means of portions of its skirt which engage into the undercuts. In this way, it is possible to dispense with separate fastening elements and to achieve a mounting and fastening of the attachment base which is simple from a manufacturing and production point of view. It is thereby particularly advantageous if the undercuts are formed by recesses arranged, in particular, at regular intervals, which are formed, for example, by the corrugation troughs of an area of the filler neck provided with external corrugations, whereby such a construction is appropriate in particular for filler necks or fuel tanks which are manufactured from plastic materials. The corrugations can be coordinated thereby to the annular bead adjoining the abutment surface or to the wall of the filler neck itself.

At the same time, the portions of the skirt which engage into the undercuts are formed appropriately by sections of the skirt adapted to be bent inwardly, whereby these sections are provided appropriately at the free end of the skirt, which is slipped over the filler neck, i.e., which form edge zones of the skirt. The skirt sections can thereby be bent radially inwardly, whereby a cut is provided, in each case, at right angles to the axis of the skirt, or they can be folded radially inwardly, whereby each section of skirt is punched free by means of two cuts which are parallel to the axis of the skirt.

In particular in case the skirt sections are bent in, it is appropriate for the protection of the filler nck if a wear-resistant abutment is coordinated axially to the bent-in skirt sections opposite the filler neck in order to preclude the possibility that the edges of the skirt sections work themselves into the material of the filler neck.

These and other objects, features and advantages of the present invention will become more apparent from the following description when taken in connection with the accompanying drawing which shows, for purposes of illustration only, two embodiments in accordance with the present invention, and wherein.

Figure 1:
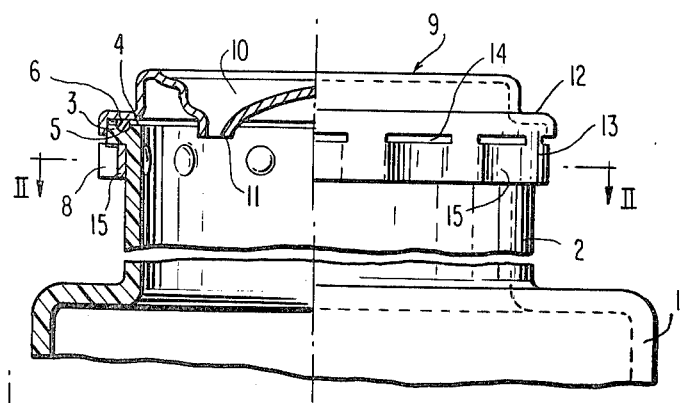
FIG. 1 is a view, partly in elevation and partly in cross section of a filler neck of a fuel tank with an attachment base mounted thereon in accordance with the present invention which is radially and axially fixed at the filler neck by pressed-in skirt sections of corrugated shape and uniformly distributed over the circumference.

Referring now to the drawing wherein like reference numerals are used throughout the various views to designate like parts, these figures illustrate a part of a fuel tank 1 made from synthetic resinous material which is provided with a formed-on filler neck 2 that is integrally molded therewith. The filler neck 2 is provided at its free end with an end face abutment surface 4 and is reinforced by an annular bead 3. This annular bead 3 projects outwardly in this embodiment and forms with its end face a part of the abutment surface.

Undercuts in the form of recesses 8 are provided axially offset to the abutment surface 4 in relation to the outer circumference of the annular bead 3. In the embodiment according to FIGS. 1 and 2, these recesses 8 are formed in the wall of the filler neck 2 and constructed as corrugations over its circumference in the area adjoining the annular bead 3. However, in a corresponding manner, the annular bead 3 itself may also have an undulated contour within its area opposite the abutment surface 4—presupposing a corresponding axial length thereof—, in which the corrugation troughs then form the recesses 8.

The attachment base generally designated by reference numeral 9 is mounted over the filler neck 2; a cap (not shown) may be screwed in a conventional manner on the attachment base 9 by means of a bayonet connection. For that purpose, the attachment base 9 includes an inwardly projecting rim 10 having a slide surface 11. The attachment base 9 is additionally provided with an annular shoulder 12, and more particularly within the transition to its skirt 13 which axially overlaps externally over the filler neck 2 in the end area thereof. An annular seal 6 of elastic material is disposed between the annular shoulder 12 and the filler neck 2, whereby a receiving groove 5 is coordinated to the ring seal 6 in the abutment surface 4.

Cuts 14 are provided at the skirt 13 at a distance to the free end thereof which extend in the circumferential direction and correspond to the recesses 8 formed by the corrugation troughs so that edge sections 15 will result which are completely separated from the skirt 13 in the axial direction and are connected with the skirt 13 only in the circumferential direction. These edge sections 15 can be pressed into the recesses 8 and can thereby fix the attachment base both in the radial and also in the axial direction. The fixing in the axial direction takes place thereby against the elastic resistance of the annular seal 6. The elasticity of this ring seal 6 makes it possible thereby to compensate for the dimensional changes and differences which occur during temperature changes as a result of differing coefficients of expansion of the materials for the filler neck 2 and the attachment base 9 while maintaining an absolute tightness. Additionally, the formed connection can be manufactured and produced in an easy and simple manner, and more particularly also by mechanized methods. It is appropriate, in particular in conjunction with such a construction, in the case of filler necks consisting of a material that is not quite so wear-resistant such as, for example, plastic material, if the axial abutment surface for the bent-in edge sections 15 is protected which, however, is not shown in the drawing for the sake of simplicity. The protection can be realized according to the present invention by an abutment ring of wear-resistant material, especially, for example, of steel, provided for protecting the axial abutment surfaces of the edge sections 15. Referring to the illustrated embodiment according to FIGS. 1 and 2, this abutment ring would have to be provided at the bottom side of the annular bead 3. The edge sections 15 are thereby precluded from digging into the material of the filler neck or of the annular bead, as a result of which a loosening might occur in the connection.

Figure 2:
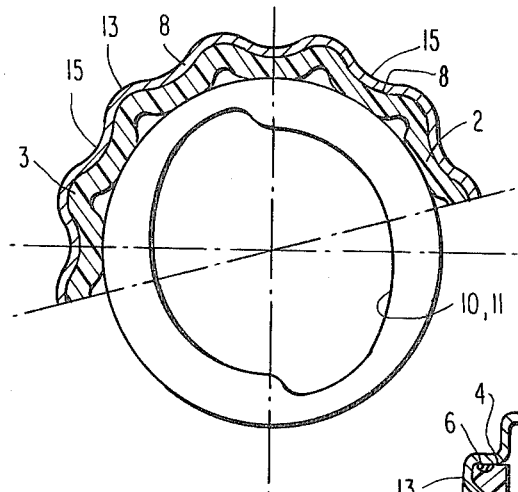
FIG. 2 is a cross-sectional view taken along line II—II of FIG. 1.
Figure 3:
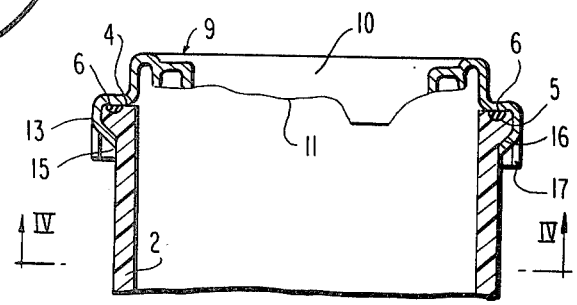
FIG. 3 is a partial cross-sectional view, similar to FIG. 1, of a modified embodiment of a fuel tank with a different connection of the attachment socket in accordance with the present invention.
Figure 4:
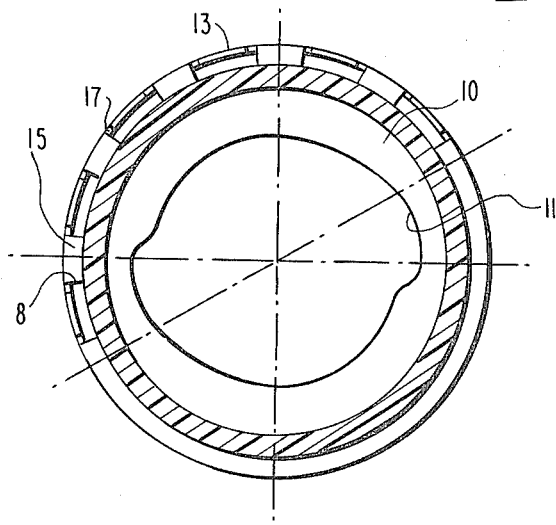
FIG. 4 is a cross-sectional view, taken along line IV—IV of FIG. 3.

In the embodiment according to FIGS. 3 and 4 illustrating a construction which in principle is the same as that of FIGS. 1 and 2, there is provided an arrangement of the recesses 8 in the annular bead 3, and more particularly starting from the end face of the annular bead 3, opposite the abutment surface 4. The recesses 8 include end faces 16 starting from the outside of the annular bead 3, which extend inclined with respect to the filler neck 2 preferably at an angle of less than 90° with respect to the fuel tank. The edge sections 15 are pivoted or bent into these recesses 8 for purposes of fastening the attachment base 9; in this construction the edge sections 15 are cut free by cuts 17 extending parallel to the axis of the attachment base.

In this embodiment, the axial clamping can be realized directly by bending over the edge sections 15 whereas in the embodiment according to FIGS. 1 and 2 at first an axial clamping has to be undertaken during the assembly before the end sections can be bent in.

An absolutely tight and wear-resistant connection will result in both embodiments described and illustrated herein which can be manufactured in a simple manner.

While we have shown and described only two embodiments in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

We claim:

1. A filler neck arrangement for fuel tanks for motor vehicles comprising a connecting means for connection to a filler neck of a tank, said connection means including shoulder means for overlapping an end surface associated with one end of the filler neck, an elastic seal disposed between said shoulder means and the end surface of said filler neck in a manner forming a seal therebetween, skirt means extending from said shoulder means for fixedly connecting said connecting means to said filler neck, said skirt means including a plurality of projections projecting inwardly and arranged at an angular distance from one another, a plurality of recess means associated with said filler neck for cooperating with said plurality of projections, each of said plurality of recess means extending in the longitudinal direction of said filler neck and disposed at a distance relative to said end surface, wherein said plurality of projections engage with said plurality of recess means in a form-locking manner for fixed attachment of said connecting means to said filler neck, said connecting means including means for releasably securing a cap for said filler neck arrangement.

2. A filler connection according to claim 1, wherein the plurality of projections are adapted to be bent or swivelled inward into a corresponding recess means for fixedly attaching said connecting means to said filler neck.

3. The filler arrangement according to claim 1 or 2, wherein the elastic seal is a ring seal.

4. A filler arrangement according to claim 1, wherein the recess means is formed by recessed areas defining corrugations on the filler neck.

5. A filler arrangement according to claim 4, wherein a wall of the filler neck includes the corrugations formed integrally therewith.

6. A filler arrangement according to claim 5, including a ring-shaped means for resisting wear disposed against a surface of the skirt means facing the recess means.

7. The filler arrangement according to claim 1, wherein the filler neck includes an annular bead, said recess means being provided in the annular bead.

8. The filler arrangement according to claim 1, 4, 5 or 7, wherein the plurality of projections of the skirt means engaging into the recess means are delimited by edge sections formed in the skirt means.

9. The filler arrangement according to claim 8, wherein said edge sections are adapted to be bent-in.

10. The filler arrangement according to claim 8, wherein the edge sections of the recess means are delimited by way of cuts.

11. A filler arrangement according to claim 1, wherein the filler neck of the fuel tank is of a plastic material.

12. A filler arrangement according to claim 1, wherein said plurality of projections include edge sections delimited by cuts in said skirt means.

13. The filler arrangement according to claim 1, wherein the filler neck includes an annular bead and a wall portion of the filler neck being of corrugated construction adjoining the annular bead wherein said recess means is formed as part of the corrugated construction.

* * * * *